March 8, 1966  I. G. MOORE ETAL  3,238,847
FORCE-EXERTING APPARATUS
Filed July 20, 1964  9 Sheets-Sheet 1

United States Patent Office 3,238,847
Patented Mar. 8, 1966

3,238,847
FORCE-EXERTING APPARATUS
Ivan Geoffrey Moore, Horatio Leslie Higgins, and Woldimar Sobol, all of London, England, assignors to Westinghouse Brake and Signal Company Limited, London, England
Filed July 20, 1964, Ser. No. 383,643
Claims priority, application Great Britain, July 22, 1963, 28,890/63
9 Claims. (Cl. 91—41)

This invention relates to force-exerting apparatus and more particularly, although not exclusively, to apparatus of this kind such as jacks or pit-props, or such apparatus embodied in a vehicle braking system to provide the so-called "hand-brake" for the vehicle.

The present invention provides a force-exerting apparatus comprising an output member movable from a first position until arrested by a load, a motor drivingly connected to the output member for so moving the member and for causing the member to exert a force on the load, and such means by which the output member can be retained in its position in which it is arrested by and exerts a force against the load, wherein the brake means comprises a screw-threaded first member movable with the output member and threadedly engaged by a second member provided with one part of the brake which part is engageable with a second part of the brake to prevent relative rotation of the first and second members, the brake parts being resiliently urged into engagement one with the other and the arrangement being such that by said movement of the output member the brake parts tend to be disengaged against the effort resiliently urging them together to permit relative rotation of the first and second members when the output member is so moved, whereas the reaction to said force exerted by the output member causes the brake parts to be more firmly urged together to prevent relative rotation of the first and second members and thereby prevent return of the output member under the effort of the reaction to the force it is exerting until the brake parts are positively disengaged.

Conveniently, the motor is a fluid-operated motor and there may be provided fluid-operated brake means whereby the brake parts can be released from enagement one with the other against the effort resiliently urging them together. In such a case, there may be provided a fluid control circuit the arrangement of which is such that in one manner of operation fluid pressure is supplied to the fluid-operated motor to cause by its operation the output member to be moved from its first position until arrested by the load and thereafter to exert a force against the load, and in a second manner of operation fluid-pressure is supplied to the brake release means to release the brake parts from engagement and thus permit the output member to return to its first position. In the second manner of operation, fluid-pressure may be initially supplied to the fluid-operated motor to exert through the output member a force to relieve said reaction and thereby relieve the brake means from the strain exerted upon it by the reaction, the fluid pressure supplied to the release means to release the brake parts from engagement one with another, automatically relieving the fluid pressure previously supplied to the fluid-operated motor to permit the output member to return to its first position.

When the motor is a fluid-operated motor it may conveniently comprise a piston-and-cylinder arrangement and in such a case the output member may comprise a piston rod connected to the piston of the arrangement. The piston rod may be coupled to the piston such as to permit pivotal movement of the piston rod relative to the piston to accommodate any slight non-axial alignment of the load and the piston.

In the fluid control circuit above mentioned, there may be provided a reversible fluid pump, operation of the pump in one direction then constituting one manner of operation of the control circuit and operation of the pump in the opposite direction then constituting said second manner of operation. The pump may be manually operable.

Alternatively, the fluid control circuit when so provided may include a fluid valve operable to a first position to secure one manner of operation of the control circuit and operable to a second position to secure said second method of operation of the control circuit.

In said one manner of operation of the fluid control circuit and where a fluid-operated motor is provided, fluid pressure may be operatively effective only in that part of the circuit including the fluid-operated motor. To achieve this, there may be provided in the fluid control circuit a non-return valve in that part of the circuit including the fluid-operated motor, which prevents the return of fluid to the pump when the fluid-operated motor has been operated to exert through the output member a force on said load.

In the second manner of opreation of the fluid control circuit above mentioned, fluid pressure may be operatively effective (in the initial stage of such operation) in that part of the circuit including the brake release means and through said part also in that part including the fluid-operated motor. With such an arrangement, in a subsequent stage of the second manner of operation of the fluid control circuit, the fluid in the part of the circuit including the brake release means may be maintained under pressure whereas the fluid in that part of the circuit including the fluid-operated motor is relieved of pressure. The change-over between the initial and the subsequent stage of the second manner of operation of the control circuit may be effected by a valve which, so long as the brake means is engaged, prevents relief of the fluid pressure in that part of the circuit including the fluid-operated motor but which is operated by the release of the brake means to permit such relief of the fluid pressure. The valve may have a valve stem which is abutted by the second member of the brake means when the brake is engaged, the valve being resiliently urged into a position to permit such relief of pressure and being retained from moving to said position by said abutment of the valve stem with the second member. There may be provided a second valve open when the output member is in its first position and closed by the movement of the output member from said first position, the second valve relieving the fluid pressure applied to the release means when the output member returns to its first position.

Also, in the second manner of operation of the fluid control circuit, fluid pressure may be additionally supplied to the fluid-operated motor to operate the motor in a direction reverse to that in which the motor was operated to move the output member from its first position, so that the output member is positively returned by the application of the fluid pressure to its first position.

The second member may be supported on a rotary bearing through which bearing the two brake parts are resiliently urged together. When such rotary bearing is provided and when there is also provided the fluid-operated brake release means, the two brake parts may be released from inter-engagement by moving the second member through a rotary bearing. The rotary bearing may constitute the above mentioned rotary bearing or there may be provided an additional rotary bearing.

One embodiment of the present invention will now be described in greater detail, by way of example only, with reference to the accompanying drawings of which.

The apparatus as shown in the accompanying drawings is specifically for use as a "hand-brake" for railway locomotives but it will be apparent that even the embodiment described could have other applications and that, moreover, the principles of the present invention have wide application.

Figure 1:
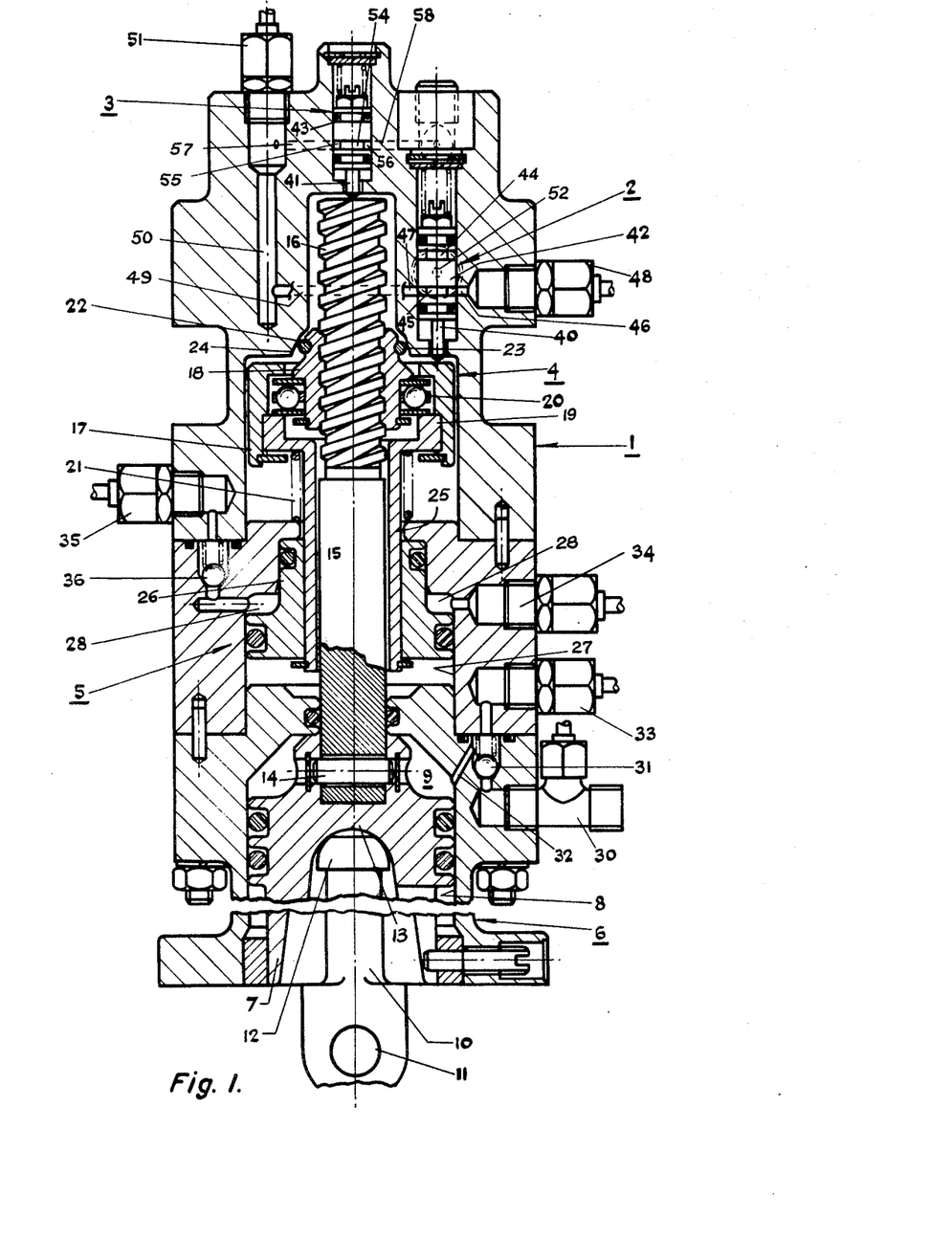
FIG. 1 is a longitudinal cross-sectional view of the mechanical parts of the apparatus.

Referring to FIG. 1, that apparatus comprises body 1 housing essentially four groups of components. Reading from top to bottom of the drawing there is, firstly, a group of two valves 2 and 3; secondly, there is a ratchet means 4; thirdly, is a ratchet release means 5; and, fourthly, there is a fluid-operated motor 6.

Dealing now with these components the fluid-operated motor 6 comprises a piston 7 slidable within a cylinder 8, there being situated at the top of piston 7 within the cylinder 8 a chamber 9. The piston 7 has coupled to it a piston rod 10 which constitutes the output member. The piston rod 10, in the application of the apparatus in a railway locomotive braking system so as to constitute the "hand-brake" of the system, would be connected by eye 11 to the brake rigging of the brake system. As a result, the rigging brake release spring (not shown) would be effective resiliently to urge the piston rod 10 into engagement with the piston 7. Thus, by virtue of the configuration of the part spherical uppermost end 12 of the piston rod 10 and the complementary cup shaped recess 13 in the piston 7, the piston rod 10 can pivot with respect to the piston 7 to accommodate any misalignment of the piston rod 10 and the piston 7.

Coupled by pin 14 to the opposite side of the piston 7 from the rod 10 so as to be movable therewith is a member 15 which is screw-threaded over its uppermost end portion 16. The portion 16 is threadedly engaged by a second member 17 comprising a nut 18 surrounded by a generally tubular housing 19 in which the nut 18 is located with only a limited freedom of axial movement by a rotary thrust ball-bearing 20.

The housing 19 is resiliently loaded by a spring 21 so that one part (constituted by a ring 22 carried by the nut 18) of a brake 23 is resiliently urged into engagement with the other part (constituted by the conical face 24 formed in the body 1) of the brake 23.

The housing 19 is provided with tubular extension 25 encircling the member 15 and carrying adjacent its lower end a piston 26 slidable in a cylinder 27. Above the piston 26 in the cylinder 27 is a chamber 28.

Turning now to the hydraulic connections in the body 1; there is, firstly, a coupling 30 which communicates with one side of a non-return valve 31. The output side of the valve 31 communicates with the chamber 9 (through passage 32) and with a second coupling 33.

Communicating with the chamber 28 are two couplings 34 and 35 the first of which communicates directly with the chamber 28 and the second of which communicates with that chamber only when a non-return valve 36 is open.

Located in the top end of the body 1 are the two valves 2 and 3 of which each is provided with a valve stem 40 and 41 respectively which are solid with the associated valve shuttle 42, 43 and urged into engagement with the housing 19 of the ratchet means 4 and the top end face of the member 15 respectively.

The shuttle 42 of the valve 2 has three lands providing between them two circumferential grooves 44 and 45.

In the position of the valve 2 as shown in FIG. 1, the groove 45 provides intercommunication between two diametrically opposed ports 46 and 47 of which 46 communicates with a connection 48 and 47 communicates through passages 49 and 50 with connection 51. Also, in the position shown of the valve 2, two other diametrically opposed ports 52 and 53 (of which 52 only can be seen in FIG. 1) are sealed from intercommunication by the middle land of the shuttle 42.

The shuttle 43 of valve 3 has only two lands with a single intermediate circumferential groove 54 which, in the position of valve 3 shown in FIG. 1, provides intercommunication between two diametrically opposed ports 55 and 56. Port 55 is connected by passage 57 to passage 50 and port 56 is connected to passage 58 and thence to a connection 59 (not shown in FIG. 1).

Figure 2:
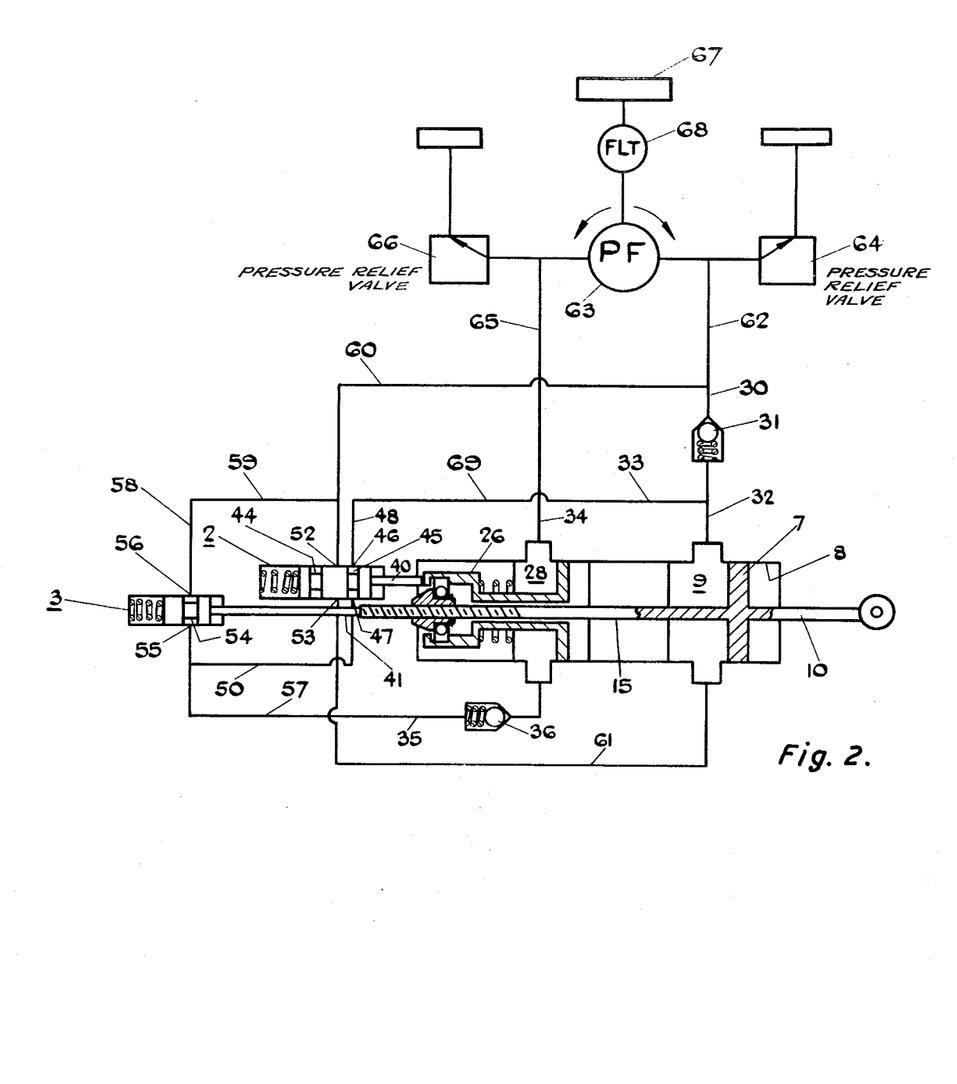
FIG. 2 shows schematically the fluid control circuit of the apparatus.

Referring now to FIG. 2, it will be seen that the port 52 is connected to the connection 30 by pipe 60 which connects also with the connection 59.

Also, the port 53 of valve 2 is connected by a pipe line 61 to chamber 9 in the cylinder 8.

The pipe line 60 and the connection 30 are coupled by a pipe line 62 to one output side of a reversible hand-operated fluid pump 63 and to a pressure limiting valve 64. The other output side of the pump 63 is connected by a pipe line 65 to the connnection 34 and to a pressure limiting valve 66 and the inlet side of the pump 63 is connected to a hydraulic supply tank 67 through a filter 68.

Further, the connections 33 and 48 are interconnected by a pipe line 69.

*Operation*

Figure 3:
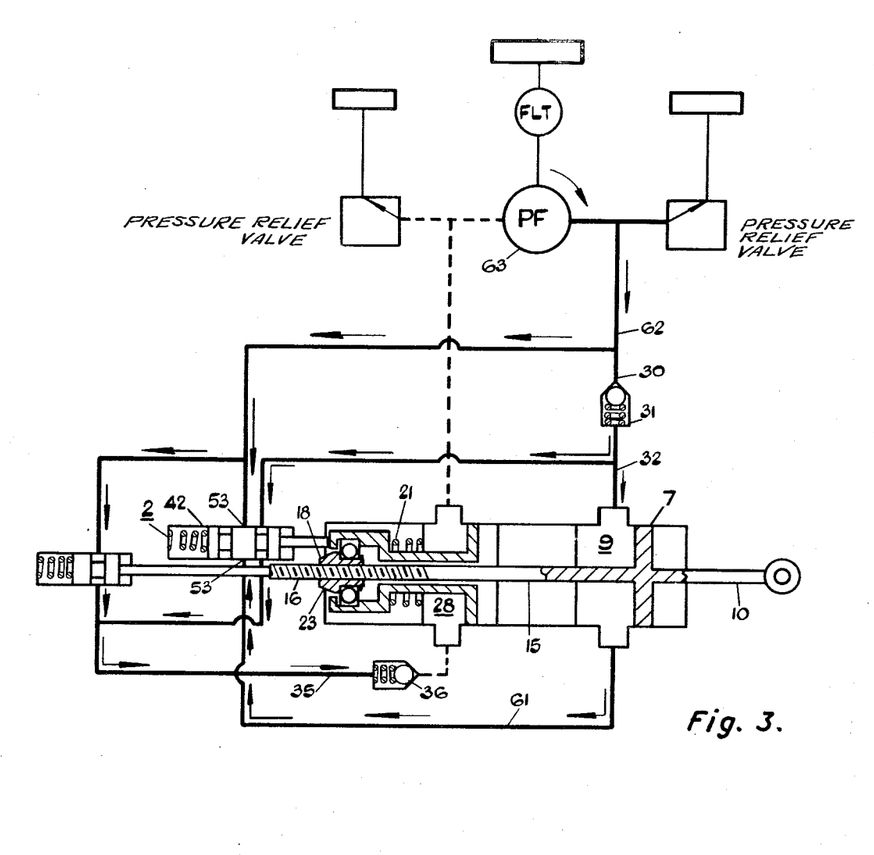
FIGS. 3–8 show schematically the various stages in the operation of the apparatus.

Referring firstly to FIG. 3, by operating the pump 63 in the respective direction, fluid pressure will be applied to the chamber 9 through pipe line 62, connection 30, non-return valve 31, and passage 32. The other side of chamber 9 will be closed by valve 2 (in which, as explained above, the port 53 will be closed by the central land of the shuttle 42) over pipe line 61.

Various other parts of the circuit (shown in full lines in FIG. 3) will also be pressurised but these are all closed circuits and such pressurisation has no operative effect. In particular, the chamber 28 will not be pressurised as pressure is only applied to the connection 35 on the other side of the non-return valve 36.

Such pressurisation of the chamber 9 causes the piston 7 to move to the right as seen in the drawing against the force of the brake rigigng return spring (not shown) effective on the piston rod 10. Movement of the piston 7 (and the piston rod 10) pulls the member 15 to the right and such movement of the member 15, through its screw-threaded portion 16, eases the brake 23 against the spring loading exerted thereon by the spring 21. As the brake 23 becomes eased, the nut 18 is free to spin and does so as the screw-threaded portion 16 of member 15 is pulled through it.

This movement of the piston 7, the piston rod 10, the member 15 and the nut 18 continues until the brake blocks engage the wheels thus preventing such further movement.

Figure 4:
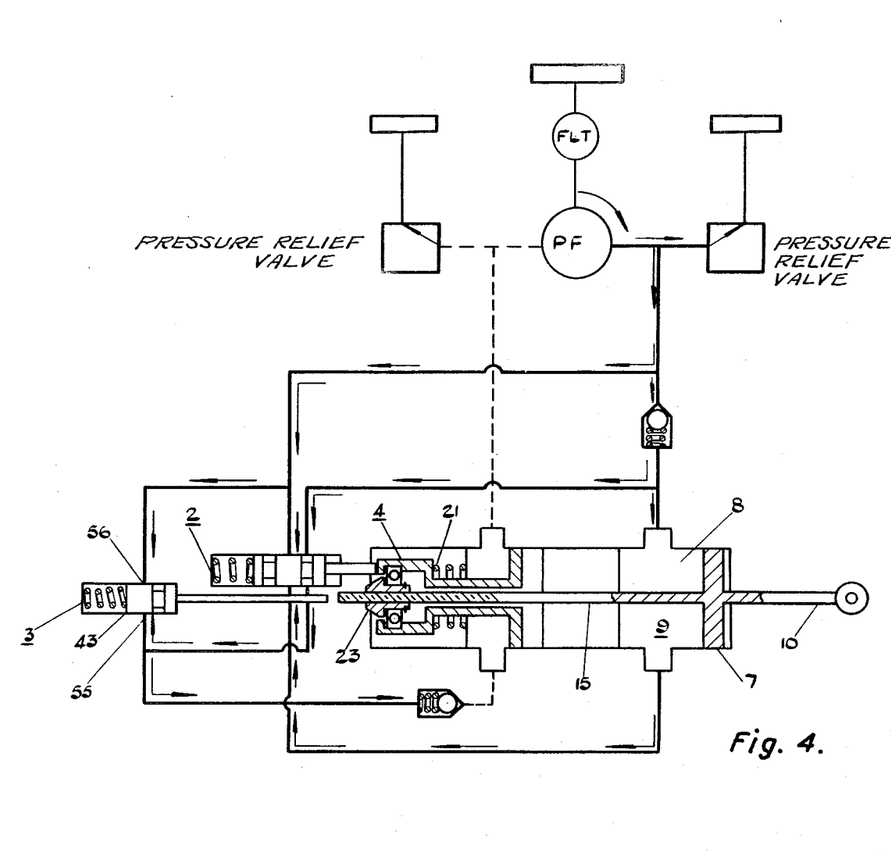

Turning now to FIG. 4 which indicates the condition of the hydraulic circuit in this situation, the hydraulic pressure now builds up in the pressurised part of the circuit in particular, builds up in the chamber 9 so that through the piston 7 and the piston rod 10 a force is exerted on the brake blocks in opposition to the reaction load generated by the engagement of the brake blocks with the wheel.

It is to be noted, here, that as the member 15 previously moved to the right, the shuttle 43 of the valve 3 was moved by its spring loading to close the two ports 55 and 56 from intercommunication.

As the push rod 10 (and, hence, the member 15) is prevented from further movement, the spring 21 is now once again fully effective to re-make the brake 23 so that the ratchet means 4 serves to hold the member 15, piston 7 and push-rod 10 in their extended position.

Figure 5:
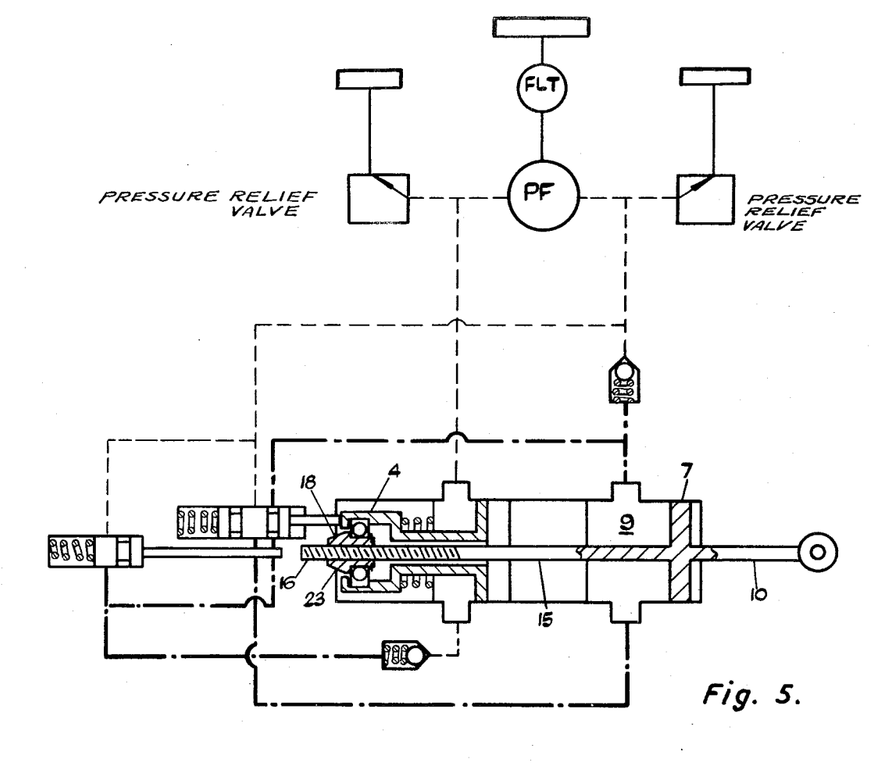

If now operation of the pump 63 is stopped, the condition of the hydraulic circuit as shown in FIG. 5 will prevail; that is to say, fluid under pressure will be trapped in certain parts of the circuit (shown in full lines in FIG. 5) and, in particular, fluid pressure will be trapped in volume which, exerted on piston 7, will be effective to maintain the brake blocks exerting a force on the wheels.

Should this fluid pressure be relieved (by leakage or otherwise) the brake blocks will continue to exert their pressure on the wheels for, to relieve this pressure, the push rod 10, piston 7 and member 15 must move to the left as viewed in FIG. 1. This cannot happen for the reason that the ratchet means 4 will prevent such movement. Tendency of these parts to move to the left under the effect of the reaction load exerted by the wheels on the brake blocks and back through the piston rod 10, piston 7 and member 15 is effective to make even more securely the brake 23 by the axial force exerted by the screw-threaded portion 16 on the nut 18 forcing the two parts 22 and 24 (see FIG. 1) into even firmer engagement.

Figure 6:
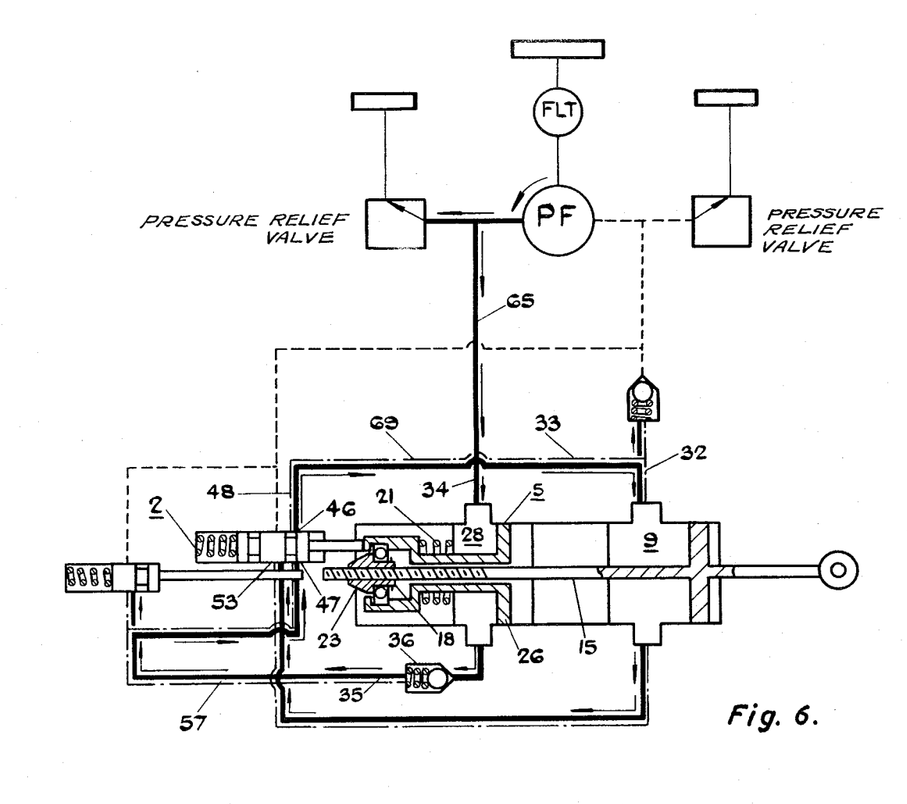

If it is now desired to release the brake blocks this is achieved by reverse operation of the pump 63. Such operation initially pressurises the parts of the circuit shown in full lines in FIG. 6. The pressure is applied firstly, to the chamber 28 through connections 35 and 34, but before it can build up to any substantial value the non-return valve 36 opens to allow the pressure to be transmitted to chamber 9 through connection 35, passage 50, ports 47 and 46, connection 48, 69, 33 and passage 32.

As the outlet of chamber 9 is still sealed off at port 53 by valve 2, the pressure is now free to build up in chambers 28 and 9. The build-up of pressure in chamber 9 tends to relieve the brake 23 of any loading to which it was subjected by previous relief of pressure in the closed circuit of FIG. 4 and when such relief of the brake 23 has occured it will remain held made by only the spring 21. However, the force of this spring 21 is relatively so small that the pressure in chamber 28 will generate a force on the piston 26 of the ratchet release means 5 sufficiently large to overcome the spring 21 and thus break the brake 23. Such breaking of the brake 23 releases the ratchet means 4 as the nut 18 is free to spin if the member 15 is moved axially.

In addition to breaking the brake 23, the pressure in chamber 28 effective on piston 26 will move the piston 26 downwards (as viewed in FIG. 1) against the spring 21.

This movement of the piston 26 (through the tubular extension 25) will move the housing 19 to the right and thus free the valve stem 40 so that it and the shuttle 42 can be moved by the resilient loading of the shuttle 42, to the right. This movement of the shuttle 42 (see FIG. 7) opens the previously closed ports 52/53 and closes the previously opened ports 46/47.

Figure 7:
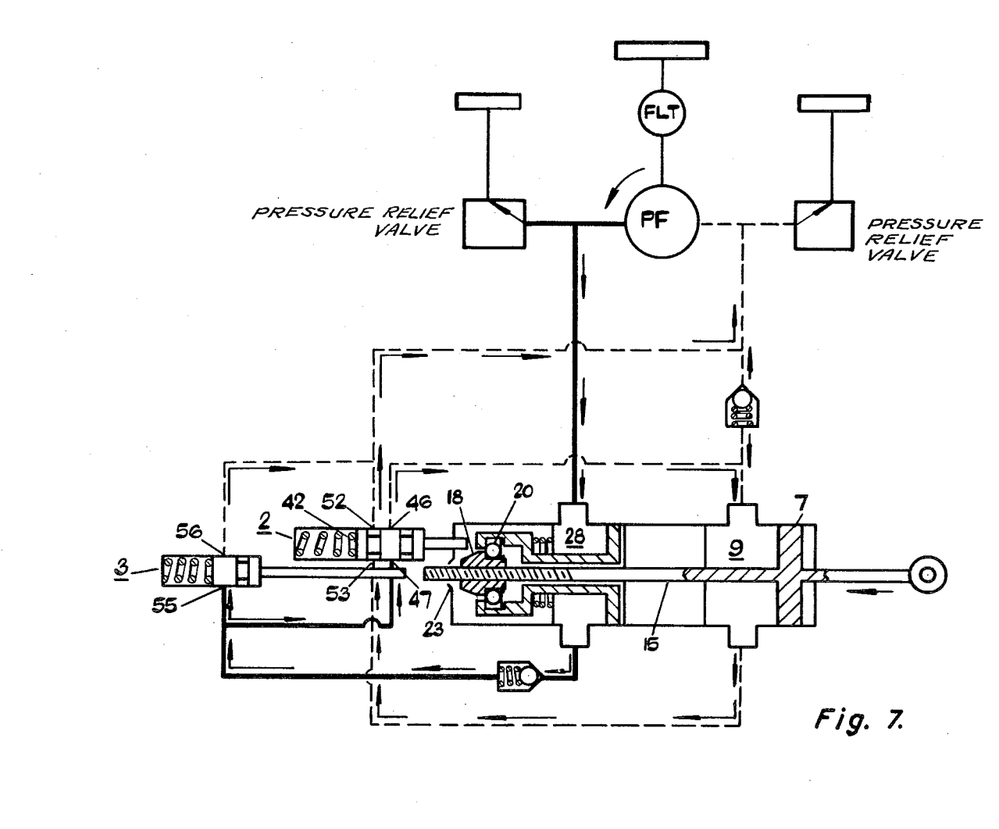

As a result the condition now pertaining in the hydraulic circuit is as shown in FIG. 7. This is to say, the pressure in chamber 9 is relieved by the opening of ports 52/53 whilst pressure is still maintained in chamber 28 by the closure of port 47 and the maintenance closed of port 55 in valve 3. The piston 7 is now returned by the brake rigging release spring.

Such return of the piston 7 is permitted by the brake 23 being held broken by the pressure in chamber 28 so that the nut 18 is free to spin (being supported on the thrust bearing 20) as the piston 7 pushes the member 15 to the left.

Figure 8:
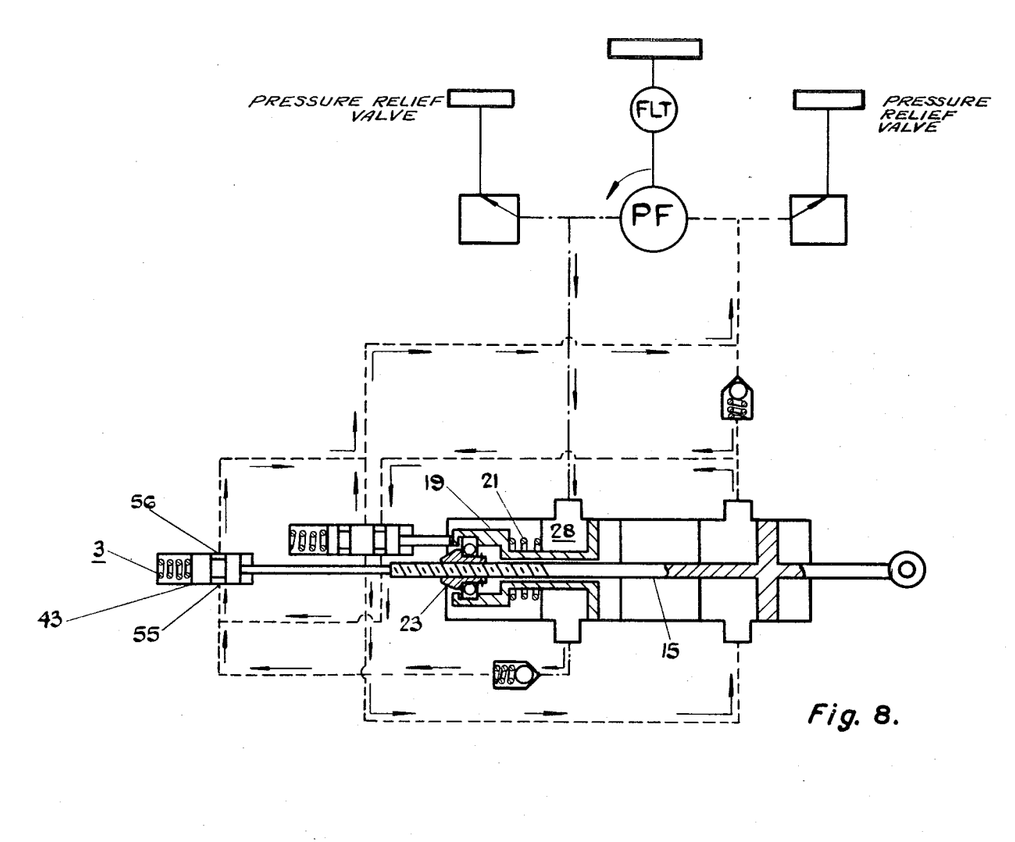

As soon as the brakes are fully released, the member 15 will engage the stem 41 of valve 3 and push the shuttle 43 of that valve to the left to re-open intercommunication of the ports 55 and 56 to permit the pressure in chamber 28 to be relieved (see FIG. 8). By such action, the spring 21 is now free to return the housing 19 to the left and re-make the brake 23 and re-engage the means 4.

The apparatus is thus returned to its initial position and is ready for re-operation.

Whilst in the above described embodiment the pump 63 is indicated as being a reversible hand-operated pump, it could clearly be operated by means other than hand. Further, a reversible pump is not necessary. A single direction pump could be used, in which case a valve would be incorporated to direct the fluid pressure generated by the pump into either pipe line 62 or pipe line 65 at will.

Figure 9:
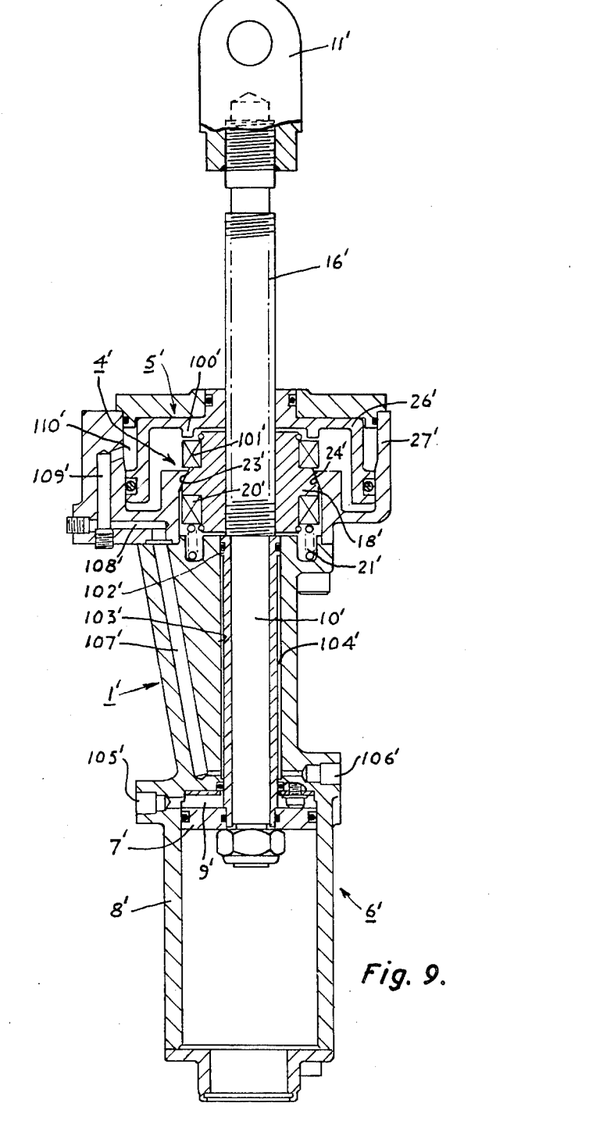
FIG. 9 shows a longitudinal cross sectional view of an alternative embodiment.

Referring to FIG. 9 of the accompanying drawings, the apparatus comprises a body housing essentially three groups of components. These are, firstly brake means 4'; secondly, there is brake release means 5'; and, thirdly, there is a fluid-operated motor 6'.

Dealing now with these components, the fluid-operated motor 6' comprises a piston 7' slidable within a cylinder 8', there being (on the upper side of the piston 7' as viewed in the drawings) a chamber 9'. The piston 7' has coupled to it a piston rod 10' which constitutes the output member. The piston rod 10', in the application of the apparatus in a railway locomotive braking system so as to constitute the "hand-brake" of the system, would be connected by eye 11' to the brake rigging of the brake system.

The piston rod 10' is screw-threaded over its upper end portion 16' and this screw-threaded portion 16' is threadedly engaged by a second member comprising a nut 18'. The nut 18' has a conical brake face 23' which is resiliently urged into engagement with a co-operating conical brake face 24' formed in the body 1' by a compression spring 21' acting on the nut 18' through a rotary bearing 20'. As before, the co-operating brake faces 23' and 24' constitute the two parts of a two-part-one-way brake forming the brake means 4'.

The brake release means 5' comprises a piston 26' slidable in a cylinder 27' constituting part of the body 1'. The piston 26' is provided with an annular protrusion 100' engageable with a second rotary bearing 101' carried by the nut 18'.

The piston rod 10' has intermediate its ends a piston flange 102' which may be considered as part of the fluid-operated motor 6'. This piston flange 102' works in a cylinder 103' which between it and the piston rod 10' provides a chamber 104'.

In the body 1' there are two ports. The first port 105' opens into the chamber 9' and the second port 106 opens into the chamber 104'. From this chamber 104' there is a conduit 107' which, via conduits 108' and 109', opens into a chamber 110' to the right of the brake release piston 26'.

The operation of the apparatus described above is as follows:

The apparatus is shown with the output member (the piston rod 10') in its so-called first position. In this position the application of fluid-pressure to the port 105' will cause the piston 7' to be driven downwardly as viewed in the drawing. As the piston 7' moves downwardly it will be drawn through the nut 18' and will tend to carry the nut 18' with it. Although such movement will be prevented by the spring 21', nevertheless, the tendency for the nut 18' to be drawn downwardly will cause the two brake faces 23' and 24' to tend to be dis-engaged. Thus, the brake means 4' will be relieved and the nut 18' will be free to spin (being supported upon the rotary bearing 20') as the threaded portion 16' of the piston rod 10' is drawn through the nut. Such movement of the piston rod 10' and the nut 18' will continue until further movement of the piston rod 10' is prevented by its engagement with a load. Thereafter, build-up of pressure in the chamber 9' will exert a force against the load. After this has occurred, even if the pressure in the chamber 9' is relieved, the piston rod 10' will not return upwardly under the reaction of the force the piston rod is exerting on the load as such a tendency of the piston rod 10' to move upwardly will, through the nut 18', cause the two brake faces 23' and 24' to be even more firmly urged together. Such increase in the effectiveness of the brake means 4' will prevent the nut 18' from spinning and will thus prevent the piston rod 10' from moving upwardly.

If it is now required to return the piston rod to its initial position, the fluid pressure in the chambers 9' will be relieved (if it has not already been relieved) and a fluid pressure applied to the port 105'). The application of fluid pressure to the port 106' will cause a pressure to build up in the chamber 104' and (through the conduits 107', 108' and 109') in the chamber 110' of the clutch release means 5'.

The build-up of pressure in the chamber 110' will cause the annular projection 100' on the piston 26' to engage the rotary bearing 104' and when the pressure has built up to a sufficient value, the piston 26' will (through the rotary bearing 101') force the nut 18' downwardly to disengage the brake faces 23' and 24'. When this occurs, the corresponding build-up of pressure in the chamber 104' which has occurred, will (through the piston flange 102') drive the piston rod 10' upwardly. During such movement of the piston rod 10', the nut 18' will be free to spin and will so do, the brake faces 23' and 24' being dis-engaged and the nut 18' supported by the piston 26' through the rotary bearing 101'.

Having thus described our invention what we claim is:

1. A force exerting apparatus comprising: an output member movable from a retracted position until arrested by a load; a motor drivingly connected to the output member for moving the output member and for causing the output member to exert a force on the load; and releasable brake means for retaining the output member in the position in which it is arrested by and exerts a force against the load, said brake means comprising a screw threaded first member connected to and movable with said output member, a second threaded member threadedly engaging said first member and provided with a first brake surface, means restraining said second thread member against any substantial movement in the direction of movement of said output member and said first threaded member so as to prevent substantial movement of said output member in the absence of relative rotional movement between said first and second threaded members, means forming a second brake surface for engagement with said first brake surface and fixed relative to said first brake surface, resilient means urging said second threaded member in a direction to retract said output member and to engage said first and second brake surfaces so as to prevent relative rotational movement between said first and second threaded members, said resilient means being relatively weaker than said motor so as to permit said motor to disengage said first and second brake surfaces during the initial movement toward the load and permit relative rotational movement between said first and second threaded members as said motor drives said output member toward said load, whereby said brake surfaces will re-engage upon termination of the movement of said output member toward said load and will be firmly engaged by the reactive force imposed by the load on said output member so as to prevent return of said output member until said brake surfaces are disengaged, and pressure responsive means for compressing said resilient means and disengaging said brake surfaces during retraction of said output member.

2. A force-exerting apparatus as claimed in claim 1, wherein second threaded member is supported on a rotary bearing through which bearing the two brake surfaces are resiliently urged together.

3. A force-exerting apparatus as claimed in claim 1, wherein the pressure responsive means releases the two brake surfaces from inter-engagement by moving the second threaded member through a rotary bearing.

4. A force-exerting apparatus as claimed in claim 3, wherein the rotary bearing through which the brake surfaces are resiliently urged together and the rotary bearing through which the second threaded member is moved to release the brake surfaces from inter-engagement, is the same rotary bearing.

5. A force-exerting apparatus as claimed in claim 1, wherein the motor is a fluid-operated motor.

6. A force-exerting apparatus as claimed in claim 5 further comprising a fluid control circuit for selectively supplying fluid pressure to said motor to cause by its operation the output member to be moved from its first position until arrested by the load and thereafter to exert a force against the load, and in a second manner of operation for supplying fluid-pressure to said pressure responsive means to release the brake surfaces from engagement and thus permit the output member to return to its first position.

7. A force-exerting apparatus as claimed in claim 6, wherein, in the second manner of operation, fluid pressure is initially supplied to said motor to exert through the optut member a force toward the load and thereby relieve the brake means from the strain exerted upon it by the load, the fluid pressure supplied to said pressure responsive means to release the brake surfaces from engagement one with another automatically relieving the fluid pressure previously supplied to the motor to permit the output member to return to its first position.

8. Apparatus as set forth in claim 5 further comprising fluid control circuit means for selectively supplying power fluid to said motor to move said output member to exert a force against the load and for preventing relief of said power fluid from said motor so as to maintain said output member in its force exerting position, for subsequently and selectively supplying power fluid to said motor and to said pressure responsive means to disengage said brake surfaces to permit relative rotation of said first and second threaded members, for subsequently and selectively maintaining the power fluid pressure to said pressure responsive means while relieving the power fluid pressure from said motor so as to permit retraction of said motor, and for subsequently relieving the power fluid pressure from said pressure responsive means so as to permit engagement of said brake surfaces upon return of said output member to its retracted position.

9. A force exerting apparatus comprising: a fluid actuated ram piston, an elongated threaded member connected to said piston, a threaded nut-like member rotatably threaded on said elongated member and having a first brake surface thereon, means forming a fixed second brake surface for cooperation with said first brake surface so as to prevent rotational movement of said nut-like member when engaged, spring means biasing said nut-like member in a piston retracting direction in a direction to engage said brake surfaces so that fluid pressure applied to extend the piston will slightly compress said spring means and disengage said brake surfaces to allow rotation of said nut-like member, thus requiring no additional means to release the brake during ram piston extesion, and pressure responsive means for selectively compressing said spring means and disengaging the brake surfaces during ram piston retraction.

References Cited by the Examiner
UNITED STATES PATENTS 2,660,027   11/1953   Geyer _____________ 91—45 X
2,859,734   11/1958   Elmer et al. ________ 91—43 X JULIUS E. WEST, *Primary Examiner.*